United States Patent [19]

Solow

[11] Patent Number: 5,029,053
[45] Date of Patent: Jul. 2, 1991

[54] REAR ILLUMINATION LICENSE PLATE FRAME

[75] Inventor: Joseph E. Solow, Plainview, N.Y.

[73] Assignee: Wolo Manufacturing Corporation, Deer Park, N.Y.

[21] Appl. No.: 442,253

[22] Filed: Nov. 28, 1989

[51] Int. Cl.$^5$ .............................................. B60Q 1/56
[52] U.S. Cl. ................................... 362/83.2; 362/31; 362/327; 40/205
[58] Field of Search ............... 362/80, 83.2, 31, 32, 362/327, 307, 83; 40/204, 205, 546; 350/97

[56] References Cited

U.S. PATENT DOCUMENTS

| D. 163,421 | 5/1951 | Rothman | 40/204 |
| 1,664,302 | 3/1928 | Leopold et al. | 40/205 |
| 1,741,610 | 12/1929 | Brooks | 362/83.2 |
| 2,361,479 | 10/1944 | Joffo | 40/204 |
| 2,562,740 | 7/1951 | Rizer | 40/204 |
| 2,579,320 | 12/1951 | Giboney | 40/204 |
| 2,689,948 | 9/1954 | Rothman | 362/83.2 |
| 4,475,298 | 10/1984 | Munoz | 40/546 |
| 4,857,890 | 8/1989 | Solow | 362/83.2 |

FOREIGN PATENT DOCUMENTS

| 8501871 | 1/1987 | Netherlands | 40/205 |
| 930799 | 7/1963 | United Kingdom | 40/204 |

Primary Examiner—Ira S. Lazarus
Assistant Examiner—D. M. Cox
Attorney, Agent, or Firm—Brumbaugh, Graves, Donohue & Raymond

[57] ABSTRACT

An illuminated license plate frame is provided with lights arranged in a cavity formed between first and second frame members. The first frame member is light transmitting and the second, outwardly facing frame member is opaque, so that the emitted light is indirectly transmitted through the light transmitting frame member to produce a soft glow illumination effect.

4 Claims, 1 Drawing Sheet

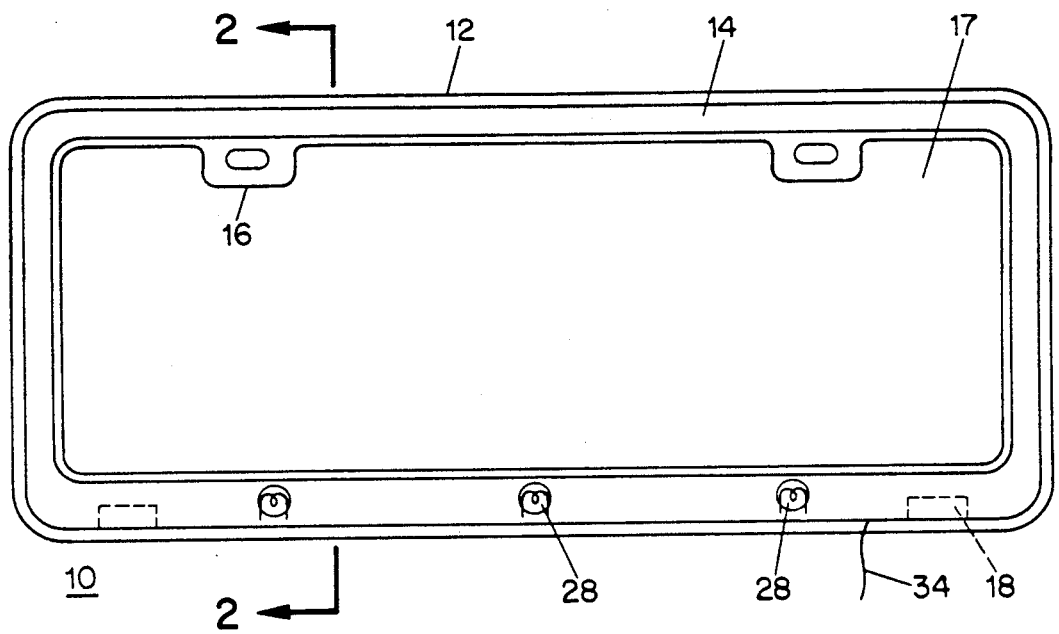
FIG. 1
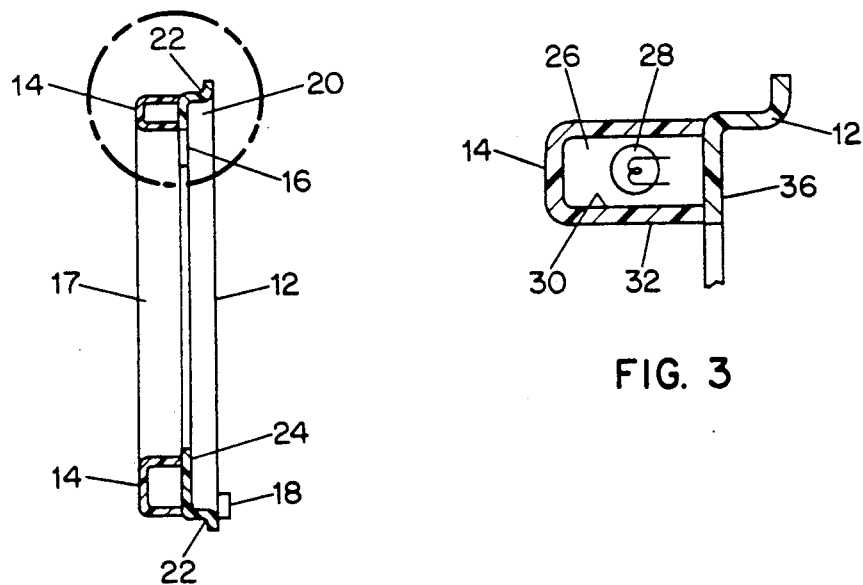
FIG. 2
FIG. 3

REAR ILLUMINATION LICENSE PLATE FRAME

BACKGROUND OF THE INVENTION

The present invention relates to illuminated license plate frames of the type including first and second frame members, usually fabricated out of plastic and having a hollow space between the frame members within which electric lights are provided. Conventionally such known license plate frames include a rear frame member, which receives the license plate, and which is made of opaque material, and an outwardly facing frame member which is made of translucent materials with lights provided between the frame members. The illuminated lights can be seen through the translucent outwardly facing frame member.

It is an object of the present invention to provide a new and improved illuminated license plate frame which provides enhanced decorative effect during both daylight and night hours.

SUMMARY OF THE INVENTION

In accordance with the present invention there is provided an illuminated license plate frame which consists of a rectangular frame having a central opening and arranged to receive a license plate on one side and to surround the peripheral edges of the license plate to enhance the appearance thereof. The frame has a hollow cross-section bounded by an outwardly facing opaque frame member and a light transmitting frame member arranged on the license plate receiving side of the opaque frame member. The light transmitting frame member has peripheral portions extending beyond the opaque frame member and light emitting means are provided in the hollow cross-section between the opaque and light transmitting frame members so that light from the light emitting means provides a soft glow in the peripheral portions of the light transmitting frame member.

In a preferred embodiment the opaque frame member includes a metallic coating on at least one surface and preferably on both surfaces, so that during daylight hours the frame has a pleasant metallic finish and during night hours it helps provide the aforesaid soft illuminated glow.

For a better understanding of the present invention, together with other and further objects, reference is made to the following description, taken in conjunction with the accompanying drawings and its scope will be pointed out in the appended.

BRIEF DESCRIPTION OF THE DRAWINGS

FIG. 1 is a plan view of a license plate frame in accordance with the present invention.

FIG. 2 is a cross-sectional view of the FIG. 1 license plate frame.

FIG. 3 is an enlarged partial cross-sectional view of the license plate frame shown in FIGS. 1 and 2.

DESCRIPTION OF THE PREFERRED EMBODIMENT

A preferred embodiment of a license plate frame 10 in accordance with the present invention is illustrated in FIGS. 1, 2 and 3. The frame 10 includes a frame member 12 which is arranged to receive a license plate and to be attached thereto. A frame member 14 is attached on the outwardly facing side of frame member 12. Frame member 12 includes tabs 16 which include slots for accommodating license plate mounting screws. Tabs 18 on the lower portion of frame member 12 are arranged to retain the lower edge of a license plate and to hold the license plate within recess 20 in frame member 12 which is bound on the periphery by skirt 22. Accordingly, the license place rests in the outwardly facing direction against flange portion 24 on the inwardly facing side of frame member 12.

Frame member 14 is formed as a U-shaped channel extending around the periphery of frame member 12 with its open side facing frame member 12. Frame members 12 and 14 both surround a central opening 17 through which the license plate central portion can be viewed. As shown in FIGS. 2 and 3 a hollow space 26 is formed frame members 12 and 14. Hollow space 26 is provided with light emitting lamps 28 which are connected to the electrical system of the automobile through wires 34 which extends from frame 10. Preferably wire 34 is connected to the tail lights or license plate light of the vehicle.

In accordance with the present invention, frame member 12 is fabricated out of light transmitting material, such as plexiglass, ABS or lucite. A red-tinted transparent ABS material and red-tinted plexiglass have been found to produce satisfactory results. Also according to the invention frame member 14 is opaque so that light from lamps 28 can not be directly viewed from the outwardly facing side of frame 10, but is viewed only by diffusion through light transmitting frame member 12 to generate a soft glow around the periphery of frame 10 and around the periphery of opening 17. In a preferred arrangement frame member 14 is fabricated out of milk colored ABS plastic and is coated on its inner surface 30 and outer surface 32 with a highly reflective metallic coating, such as aluminum, for a silver color, or brass, for a gold color. The metallic coating on surface 30 provides internal reflection of light from lamps 28 to provide further light diffusion within light transmitting frame member 12 which produces the soft glow effect. Metallic coating on outer surface 32 provides a bright metallic finish to enhance the appearance of the license plate frame, particularly during daylight hours. An additional reflective coating 36 is advantageously provided on the inwardly facing surface of frame member 12 to enhance light diffusion within frame member 12 and to make the appearance of frame 10 less sensitive to the color of the surface to which it is mounted.

The frame of the present invention provides a decorative effect for a vehicle license plate during both day and night operation. During day operation the metallic coating surrounded by the red tinted light transmitting plastic produces an attractive shiny frame effect. During night time operation, the indirect glow from light transmitting frame member 12 surrounds the periphery of frame 10 and opening 17 provides a soft lighting decorative effect.

While there has been described what is believed to be the preferred embodiment of the invention, those skilled in the art will recognize that other and further modifications may be made thereto without departing from the spirit of the invention, and it is intended to claim all such changes and modifications as fall within the scope of the invention.

I claim:

1. An illuminated license plate frame comprising a rectangular frame having a central opening and arranged to receive a license plate on one side and to surround the peripheral edges of said license plate to enhance the appearance thereof, said license plate frame having a hollow cross-section bounded by an outwardly facing opaque frame member and a light transmitting frame member arranged on said license plate receiving side of said opaque frame member, said light transmitting frame member surrounding the peripheral edges of said license plate and having all peripheral edges extending beyond said opaque frame member and wherein there is provided a metallic coating on a side of said light transmitting frame member opposite to said opaque frame member, and light emitting means in said hollow cross-section between said opaque frame member and said light transmitting frame member, whereby light from said light emitting means provides a soft glow in said peripheral edges of said light transmitting frame member.

2. An illuminated license plate frame comprising:
- a light transmitting frame member having a central opening and a first side, arranged to receive a license plate and to surround the peripheral edges of the license plate, with the central portion of said license plate adjacent said central opening for viewing from an outwardly facing second side;
- an opaque frame member partially covering said light transmitting frame member on said outwardly facing second side and having a U-shaped cross-section surrounding said central opening with the U-shaped opening facing said light transmitting frame member and forming a hollow space, said opaque frame member having smaller exterior dimensions than said light transmitting frame member and having a larger central opening than said light transmitting frame member, whereby said light transmitting frame member extends beyond said opaque frame member around the periphery of said opaque frame member and around the periphery of said central opening and wherein said first light transmitting frame member includes a metallic coating on said first side;
- and light emitting means arranged in said hollow space for providing light to said light transmitting frame member to provide an illuminated glow around said periphery of said license plate frame and said central opening.

3. An illuminated license plate frame comprising a rectangular frame having a central opening and arranged to receive a license plate on one side and to surround the peripheral edges of said license plate to enhance the appearance thereof, said frame having a hollow cross-section bounded by a first outwardly facing opaque member and a second light transmitting member arranged on said license plate receiving side of said opaque member, said light transmitting member having peripheral portions extending beyond said opaque member, wherein there is provided a metallic coating on a side of said light transmitting member opposite to said opaque member, and light emitting means in said hollow cross-section between said opaque and light transmitting members, whereby light from said emitting means provides a soft glow in said peripheral portions of said light transmitting member.

4. An illuminated license plate frame comprising:
- a first light transmitting frame member having a central opening and a first side, arranged to receive a license plate and to surround the peripheral edge thereof with the central portion of said license plate adjacent said central opening for viewing from a second outwardly facing side;
- a second opaque frame member partially covering said light transmitting member on said outwardly facing side and having a U-shaped cross-section surrounding said central aperture with the U-shaped opening facing said light transmitting member and forming a hollow space, said opaque frame member having smaller exterior dimensions than said light transmitting frame member and having a larger central aperture than said light transmitting frame member, whereby said light transmitting frame member extends beyond said opaque member around the periphery of said frame and around the periphery of said aperture wherein said first light transmitting frame member includes a metallic coating on said first side;
- and light emitting means arranged in said hollow space for providing light to said light transmitting frame member to provide an illuminated glow around said periphery of said frame and said aperture.

* * * * *